US012586799B2

(12) United States Patent
Choi et al.

(10) Patent No.: US 12,586,799 B2
(45) Date of Patent: Mar. 24, 2026

(54) APPARATUS FOR PROVIDING OPERATION LOGIC OF FUEL CELL SYSTEM

(71) Applicants: HYUNDAI MOTOR COMPANY, Seoul (KR); Kia Corporation, Seoul (KR)

(72) Inventors: Seung Kyu Choi, Yongin-si (KR); Jin Hwa Lee, Yongin-si (KR); Hyo June Lee, Yongin-si (KR); Ju Ho Shin, Yongin-si (KR); Kyung Jin Lee, Yongin-si (KR); Sung Chul Lee, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 550 days.

(21) Appl. No.: 18/085,551

(22) Filed: Dec. 20, 2022

(65) Prior Publication Data

US 2024/0170697 A1 May 23, 2024

(30) Foreign Application Priority Data

Nov. 21, 2022 (KR) ........................ 10-2022-0156566

(51) Int. Cl.
*H01M 8/04302* (2016.01)
*G05B 19/042* (2006.01)
(Continued)

(52) U.S. Cl.
CPC ...... *H01M 8/04302* (2016.02); *G05B 19/042* (2013.01); *H01M 8/04225* (2016.02); *H01M 8/04544* (2013.01); *H01M 8/04895* (2013.01); *G05B 2219/2668* (2013.01); *H01M 2008/1095* (2013.01)

(58) Field of Classification Search
CPC ......... H01M 8/04225; H01M 8/04302; H01M 8/04544; H01M 8/04559; H01M 8/04895; H01M 8/0491; H01M 8/0488; H01M 8/04865
See application file for complete search history.

(56) References Cited

U.S. PATENT DOCUMENTS

| | | | |
|---|---|---|---|
| 11,217,802 | B2 | 1/2022 | Kim |
| 2006/0024563 | A1 | 2/2006 | Ogura |
(Continued)

FOREIGN PATENT DOCUMENTS

| | | |
|---|---|---|
| CN | 114447380 A | 5/2022 |
| EP | 1622218 A1 | 2/2006 |
(Continued)

OTHER PUBLICATIONS

Office Action issued in corresponding Korean Patent Application No. 10-2022-0156566 dated Nov. 18, 2024.
(Continued)

*Primary Examiner* — Brittany L Raymond
(74) *Attorney, Agent, or Firm* — MORGAN, LEWIS & BOCKIUS LLP

(57) ABSTRACT

An apparatus for providing operation logic of a fuel cell system may include an activation part configured to perform activation on a fuel cell, and an operating performance part configured to perform constant current operation according to the performing of activation.

15 Claims, 10 Drawing Sheets

(51) Int. Cl.
    *H01M 8/04225*          (2016.01)
    *H01M 8/04537*          (2016.01)
    *H01M 8/04858*          (2016.01)
    *H01M 8/10*               (2016.01)

(56)                    References Cited

U.S. PATENT DOCUMENTS

| | | | |
|---|---|---|---|
| 2007/0009773 | A1 | 1/2007 | Xie |
| 2009/0286112 | A1* | 11/2009 | Oh ..................... H01M 8/0491 |
| | | | 429/523 |
| 2019/0288312 | A1 | 9/2019 | Kim |

FOREIGN PATENT DOCUMENTS

| | | | |
|---|---|---|---|
| KR | 10-2000-0001248 | A | 1/2000 |
| KR | 2000-0001248 | A | 1/2000 |
| KR | 10-2018-0100778 | A | 9/2018 |
| KR | 10-2019-0108302 | A | 9/2019 |

OTHER PUBLICATIONS

Extended European Search Report dated Jun. 17, 2024, issued in corresponding European Patent Application No. 22215625.9.
Office Action issued in corresponding Korean Patent Application No. 10-2022-0156566 dated May 26, 2025, with English translation.

* cited by examiner

Representative drawing (FIG. 1)
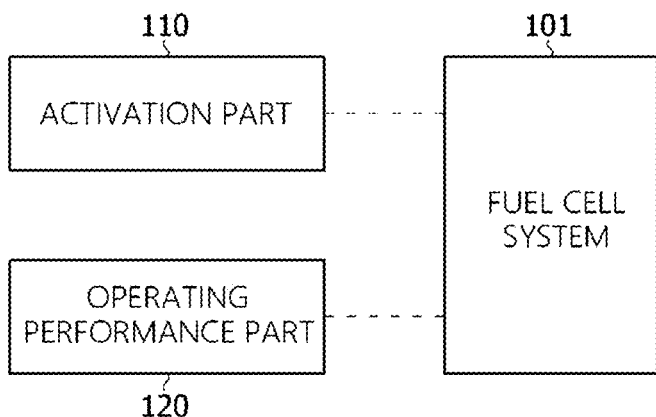

[FIG. 2]
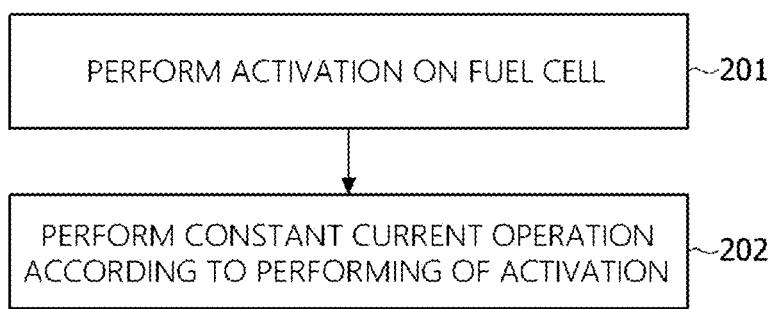

[FIG. 3]
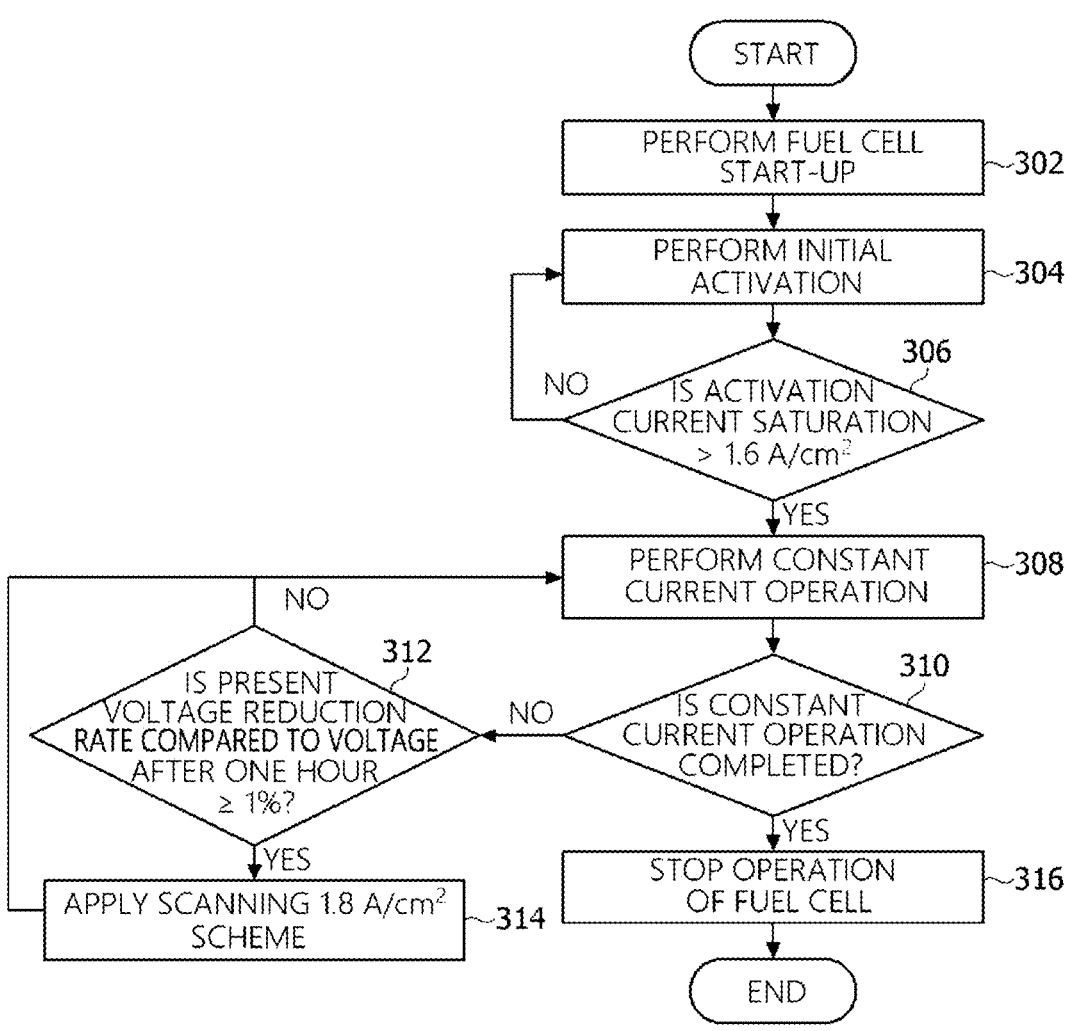

[FIG. 4]
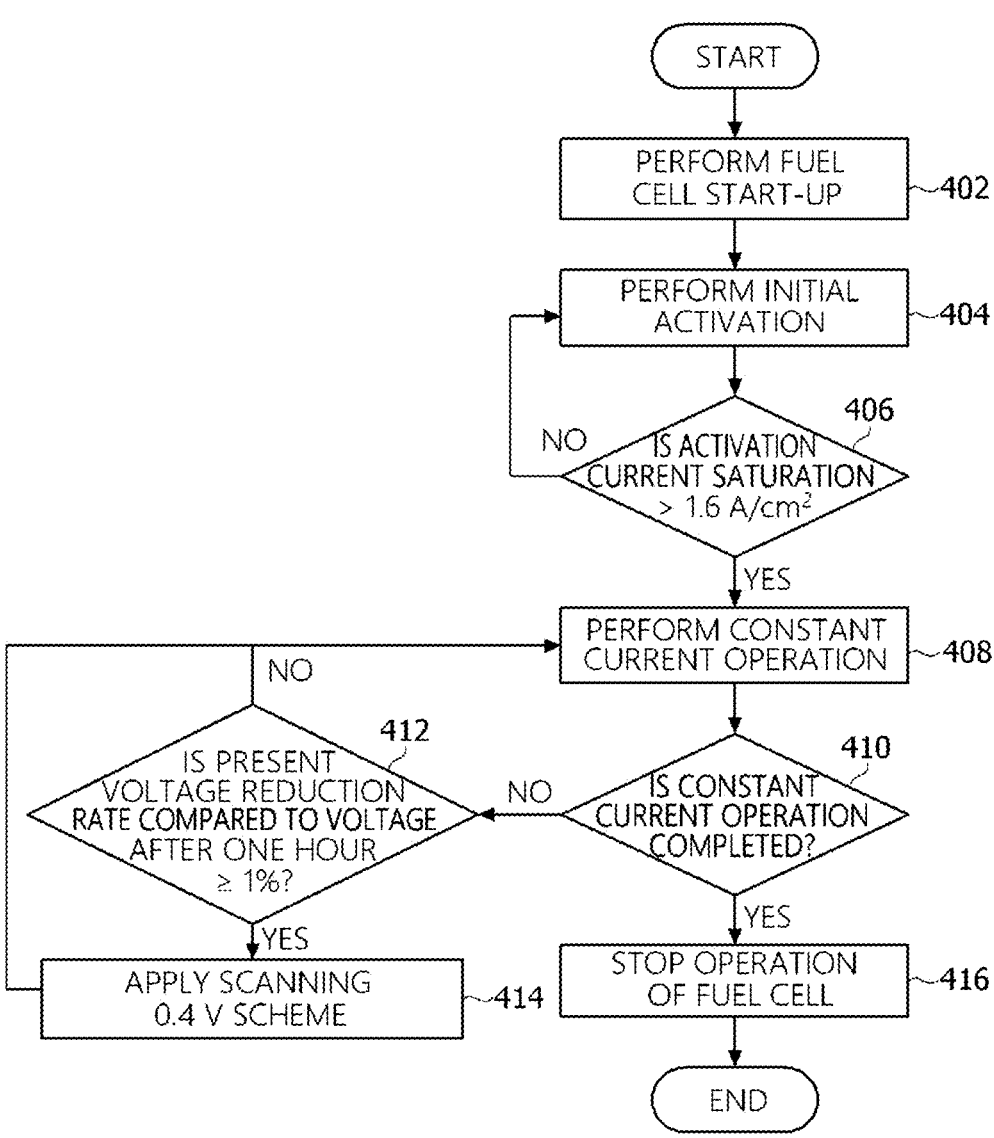

[FIG. 5]
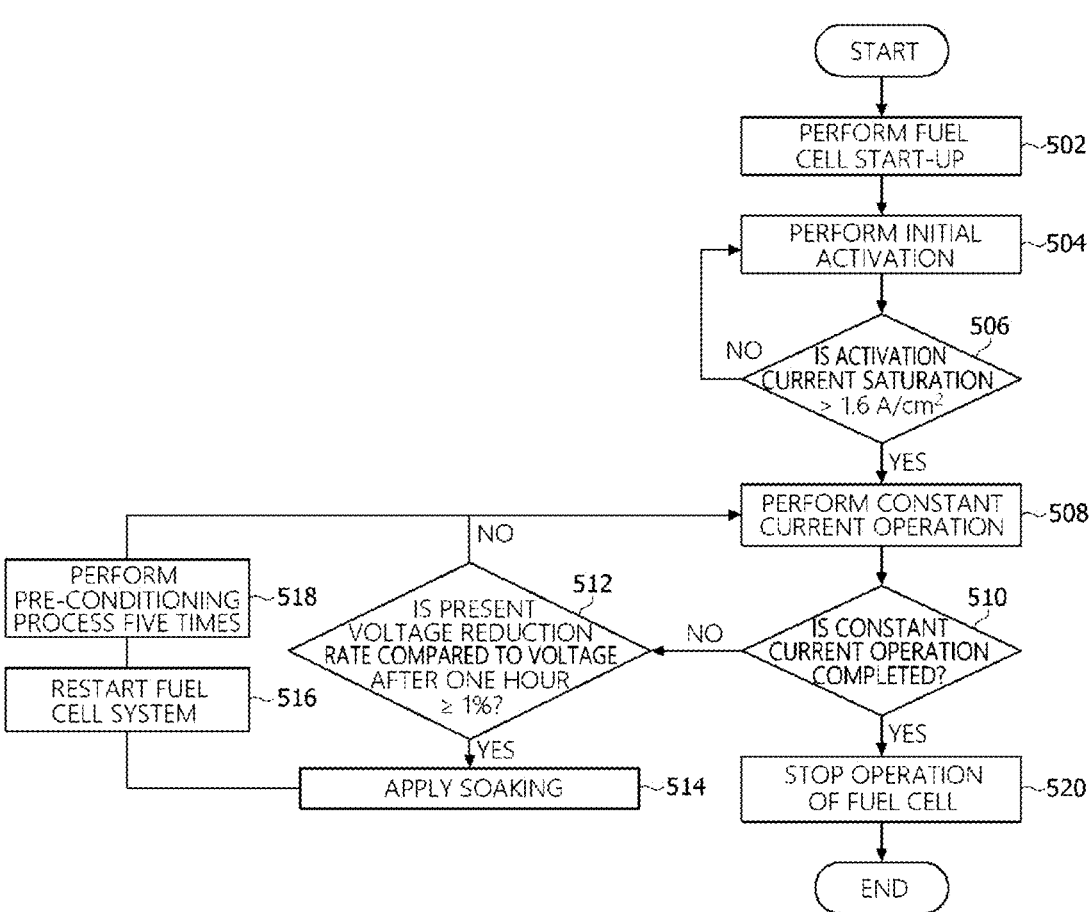

[FIG. 6]
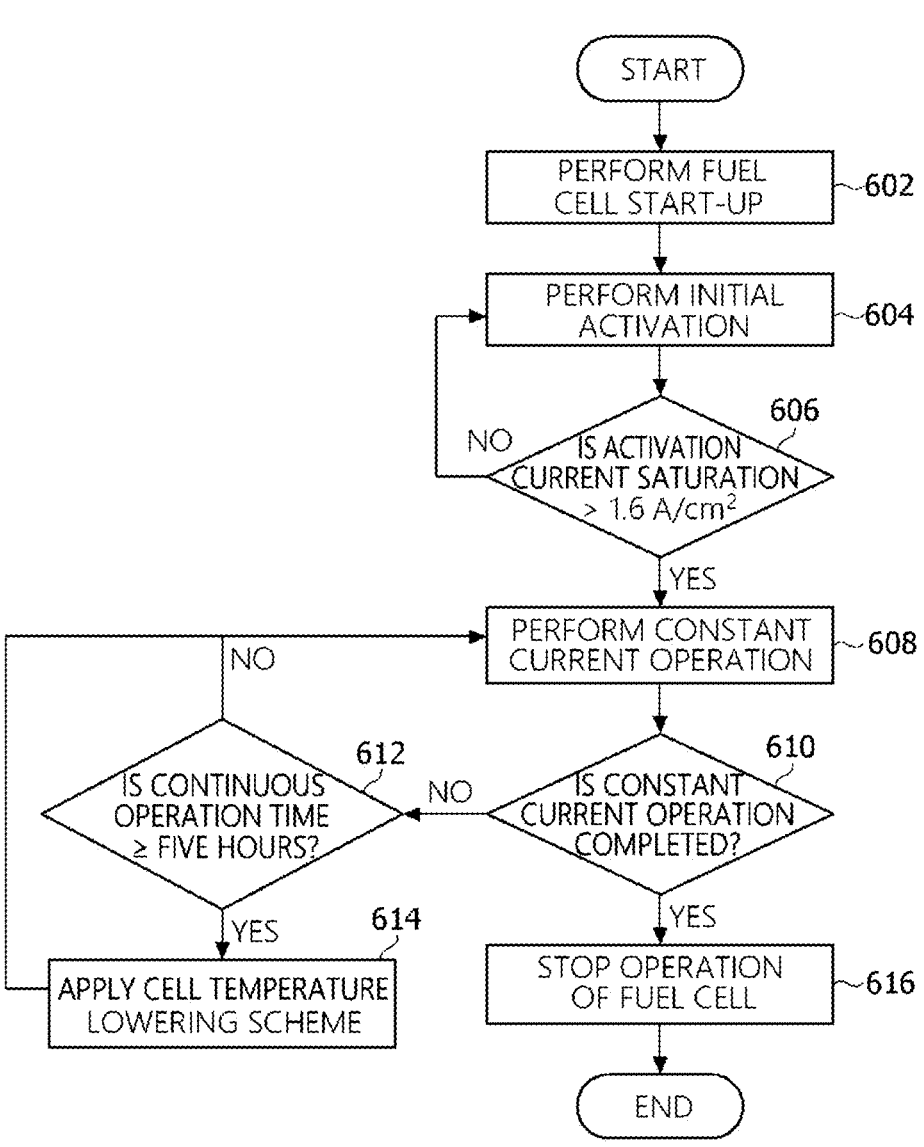

[FIG. 7]
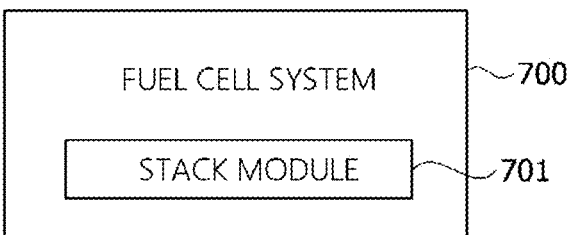

[FIG. 8]
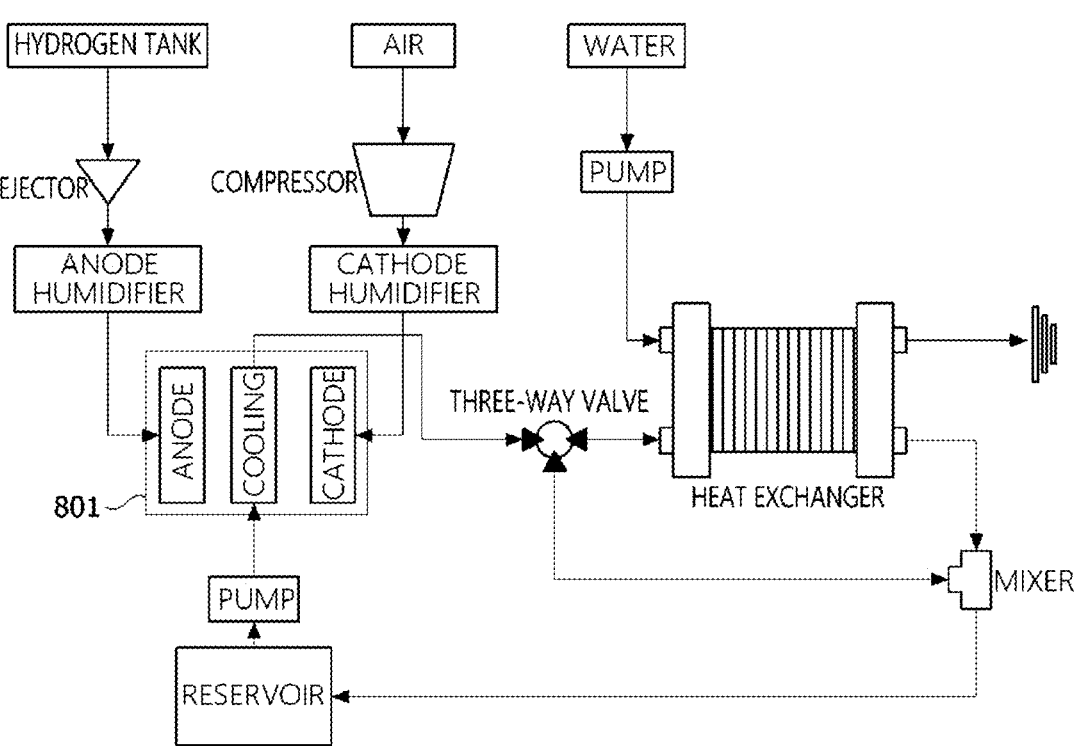

[FIG. 9]
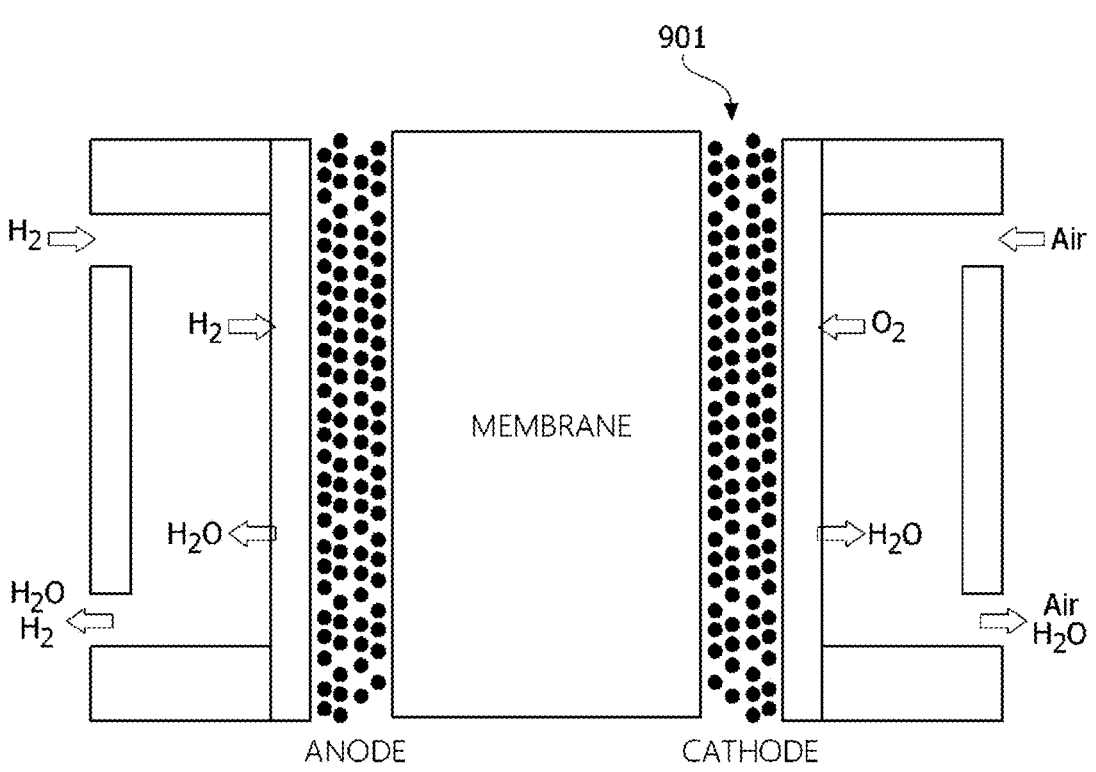

[FIG. 10]
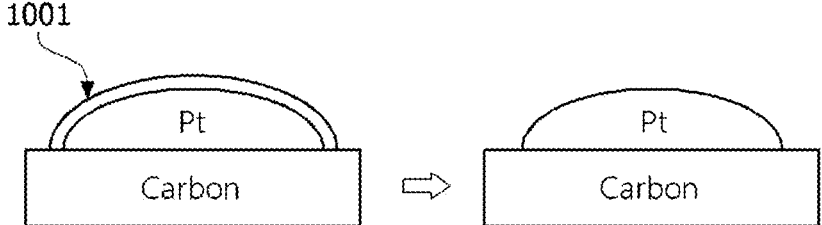

APPARATUS FOR PROVIDING OPERATION LOGIC OF FUEL CELL SYSTEM

CROSS-REFERENCE TO RELATED APPLICATION

This application claims priority to and the benefit of Korean Patent Application No. 10-2022-0156566, filed on Nov. 21, 2022, the disclosure of which is incorporated herein by reference in its entirety.

BACKGROUND

1. Field of the Invention

The disclosure relates to an apparatus and a method for providing operation logic of a fuel cell system, and a fuel cell system, more particularly, to operation logic in a recovery mode for improving the performance of constant current evaluation of a fuel cell for building power generation and improving a voltage reduction rate.

2. DISCUSSION OF RELATED ART

A fuel cell continuously generates a constant current in a power generation system, and continuous operation is performed using the constant current in a low current region.

As the fuel cell proceeds with constant current evaluation in continuous operation, an oxide is generated on a surface of platinum (Pt) used as a catalyst of the fuel cell, and since the reactivity of the platinum catalyst is reduced due to the generated oxide film formed thereon, there is a problem in that the performance of the fuel cell is degraded and a voltage reduction rate is increased.

However, although research for solving the above problem is being carried out, it is difficult to solve the above problem.

SUMMARY OF THE INVENTION

According to an aspect of the disclosure, there is provided an apparatus for providing operation logic of a fuel cell system, which includes an activation part configured to perform activation on a fuel cell, and an operating performance part configured to perform a constant current operation in response to the activation.

The activation part may perform the activation again on a basis of an activation current.

The activation part may compare a value of the activation current with a preset threshold value.

The operating performance part may perform the constant current operation on the basis of the activation current.

The operating performance part may include a fuel cell management part configured to manage the fuel cell on a basis of a variation in voltage while the constant current operation is performed.

The fuel cell management part may manage at least a part of a stack module of the fuel cell.

According to another aspect of the disclosure, there is provided a method of providing operation logic of a fuel cell system, which includes performing, by an activation part, activation on a fuel cell, and performing, by an operating performance part, a constant current operation in response to the activation.

The performing of the activation may include performing the activation again on a basis of an activation current.

The performing of the activation may include comparing, by the activation part, a value of the activation current with a preset threshold value.

The performing of the constant current operation may include performing, by the operating performance part, the constant current operation on the basis of the activation current.

The performing of the constant current operation may further include managing, by a fuel cell management part, the fuel cell on a basis of a variation in voltage while the constant current operation is performed.

The managing of the fuel cell may include managing, by the fuel cell management part, at least a part of a stack module of the fuel cell.

According to still another aspect of the disclosure, there is provided a fuel cell system including a fuel cell including a stack module, wherein the fuel cell is configured to be activated, and subjected to a constant current operation in response to the activation.

The activation of the fuel cell may be performed again on a basis of an activation current.

At least a part of the stack module may be configured to be managed on a basis of a variation in voltage while the constant current operation is performed.

BRIEF DESCRIPTION OF THE DRAWINGS

The above and other objects, features and advantages of the disclosure will become more apparent to those skilled in the art by describing exemplary embodiments thereof in detail with reference to the accompanying drawings, in which:

FIG. 1 is a block diagram illustrating of an apparatus for providing operation logic of a fuel cell system according to an embodiment;

FIG. 2 is a flowchart illustrating a method of providing operation logic of a fuel cell system according to an embodiment;

FIG. 3 is a flowchart illustrating a scanning 1.8 A/cm$^2$ scheme of the method of providing operation logic of a fuel cell system according to an embodiment;

FIG. 4 is a flowchart illustrating a scanning 0.4 V scheme of the method of providing operation logic of a fuel cell system according to an embodiment;

FIG. 5 is a flowchart illustrating a soaking scheme of the method of providing operation logic of a fuel cell system according to an embodiment;

FIG. 6 is a flowchart illustrating a cell temperature lowering scheme of the method of providing operation logic of a fuel cell system according to an embodiment;

FIG. 7 is a block diagram illustrating a fuel cell system according to an embodiment;

FIG. 8 is a block diagram illustrating a fuel cell system according to an embodiment;

FIG. 9 is a block diagram illustrating a stack module of the fuel cell system according to an embodiment; and FIG. 10 is an enlarged view illustrating a surface of a platinum catalyst according to an embodiment.

DETAILED DESCRIPTION OF EXEMPLARY EMBODIMENTS

Hereinafter, exemplary embodiments of the present disclosure will be described in detail with reference to the accompanying drawings.

However, the technical idea of the disclosure is not limited to some embodiments to be described but may be implemented in various different forms, and, within the scope of the technical idea of the disclosure, one or more among components in the embodiments may be used by being selectively combined and substituted.

Further, unless specifically defined and described, terms used in the embodiments of the disclosure (including technical and scientific terms) may be construed as meanings which are generally understood by those skilled in the art to which the disclosure pertains, and generally used terms such as terms defined in the dictionary may be interpreted in consideration of the contextual meaning of the related art.

In addition, terms used in the embodiments of the disclosure are intended to describe the embodiments and are not intended to limit the disclosure.

In the present specification, the singular forms may include the plural forms unless the context clearly dictates otherwise, and, when "at least one (or one or more) among A, B, and (or) C" is stated, this expression may include one or more among all possible combinations of A, B, and C.

In addition, in describing components of embodiments of the disclosure, the terms first, second, A, B, (a), (b), and the like can be used.

These terms are intended to distinguish one component from other components, but the nature and the order or sequence of the components is not limited by these terms.

In addition, when a component is described as being "linked," "coupled," or "connected" to another component, the component is not only directly linked, coupled, or connected to another component, but also "linked," "coupled," or "connected" to another component with still another component disposed between the component and another component.

Further, when a component is described as being formed or disposed "on (above) or under (below)" another component, the term "on (above) or under (below)" includes not only when two components are in direct contact with each other, but also when one or more other components are formed or disposed between the two components. Further, when a component is described as being "on (above) or below (under)," the description may include the meanings of an upward direction and a downward direction based on one component.

Hereinafter, embodiments of the disclosure will be described in detail with reference to the drawings, the same reference numerals are given to the same or corresponding components regardless of the drawing number, and duplicate descriptions thereof will be omitted herein.

FIG. 1 is a block diagram illustrating of an apparatus for providing operation logic of a fuel cell system according to an embodiment.

According to an embodiment, an apparatus for providing operation logic of a fuel cell system 101 may include an activation part 110 that performs activation on a fuel cell, and an operating performance part 120 that performs constant current operation according to the activation.

The apparatus for providing operation logic of a fuel cell system may include at least some of the fuel cell system 101, a fuel cell, a computing device, an electronic circuit, an electric circuit, and a semiconductor. Also, the apparatus for providing operation logic of a fuel cell system may be included in the fuel cell system 101.

According to an embodiment, the activation part 110 may perform the activation again on the basis of an activation current.

According to an embodiment, the activation part 110 may compare a value of the activation current with a preset threshold value.

According to an embodiment, the operating performance part 120 may perform constant current operation on the basis of the activation current.

According to an embodiment, the operating performance part 120 may further include a fuel cell management part (not shown) configured to manage the fuel cell on the basis of a variation in voltage while constant current operation is performed. The fuel cell may be included in at least a part of the fuel cell system 101.

According to an embodiment, the fuel cell management part may manage at least a part of a stack module of the fuel cell system 101.

The apparatus for providing operation logic of a fuel cell system may have an advantage of providing operation logic of a recovery mode, which can remove an oxide film formed on a surface of a platinum catalyst and hydrate an inside of the fuel cell to further improve the performance of the fuel cell in constant current operation, and reduce a voltage reduction rate.

In the case of long-term operation of fuel cell constant current evaluation for building power generation, the apparatus for providing operation logic of a fuel cell system has an effect of periodically removing the oxide film on the surface of the platinum catalyst and hydrating the inside of the fuel cell, thereby providing an environment capable of improving the performance of the fuel cell and reducing the voltage reduction rate.

FIG. 2 is a flowchart illustrating a method of providing operation logic of a fuel cell system according to an embodiment.

According to an embodiment, each operation of the method of providing operation logic of a fuel cell system may be performed by at least some of the components of the apparatus for providing operation logic of a fuel cell system.

In operation 201, the apparatus for providing operation logic of a fuel cell system may perform activation on the fuel cell.

The apparatus for providing operation logic of a fuel cell system may perform the activation again on the basis of an activation current.

The apparatus for providing operation logic of a fuel cell system may compare a value of the activation current with a preset threshold value.

In operation 202, the apparatus for providing operation logic of a fuel cell system may perform constant current operation according to the activation.

According to an embodiment, the apparatus for providing operation logic of a fuel cell system may perform constant current operation on the basis of the activation current.

According to an embodiment, the apparatus for providing operation logic of a fuel cell system may manage the fuel cell on the basis of a variation in voltage while performing constant current operation.

According to an embodiment, the apparatus for providing operation logic of a fuel cell system may manage at least a part of a stack module of the fuel cell.

FIG. 3 is a flowchart illustrating a scanning 1.8 A/cm$^2$ scheme of the method of providing operation logic of a fuel cell system according to an embodiment.

Referring to FIG. 3, the operation logic to which the scanning 1.8 A/cm$^2$ scheme is applied can be seen.

In operation 302, the apparatus for providing operation logic of a fuel cell system first performs fuel cell start-up and may inject the maximum flow rate under conditions in which a cell temperature is 65° C., relative humidity is 100%, and a stoichiometric ratio (SR) is An(H$_2$):Ca(Air)=1.5:2.0.

In operation 304, the apparatus for providing operation logic of a fuel cell system may scan an open circuit voltage (OCV)↔0.4 V by 0.1V in a constant voltage (CV) mode as an initial activation operation and maintain the voltage at 0.4 V for four minutes.

In operation 306, when a current density value at the voltage of 0.4 V is less than or equal to a preset value such as 1.6 A/cm$^2$, the apparatus for providing operation logic of a fuel cell system may further perform the activation.

In operation 308, when the current density value of the activation/saturation is greater than or equal to 1.6 A/cm$^2$ (preset value/threshold value), the apparatus for providing operation logic of a fuel cell system may proceed/perform constant current operation. In this case, since the cell temperature is 65° C., the RH is 100%, and the SR is An(H$_2$):Ca(Air)=1.33:2.0, the apparatus for providing operation logic of a fuel cell system may measure a voltage by switching to a constant current (CC) mode and applying a current density of 564 mA/cm$^2$.

In operation 310, the apparatus for providing operation logic of a fuel cell system may determine whether the constant current operation is completed.

In operation 312, when it is determined that the constant current operation is not completed, the apparatus for providing operation logic of a fuel cell system may calculate an average voltage over ten minutes after one hour of constant current evaluation, and then may determine whether a present voltage is decreased by 1% or more from the average voltage.

In operation 314, when the present voltage is decreased by 1% or more from the average voltage, the apparatus for providing operation logic of a fuel cell system may apply a scanning 1.8 A/cm$^2$ scheme. The apparatus for providing operation logic of a fuel cell system may maintain the CC mode in the scanning 1.8 A/cm$^2$ scheme, scan 564 mA/cm$^2$↔1.8 A/cm$^2$ by 0.2 A/cm$^2$, and maintain 1.8 A/cm$^2$ for one minute.

In operation 316, the apparatus for providing operation logic of a fuel cell system may stop the operation of the fuel cell when it is determined that the constant current operation is completed.

The apparatus for providing operation logic of a fuel cell system may provide a protocol to which the scanning 1.8 A/cm$^2$ scheme is applied, and when a voltage is decreased by 1% or less (a preset ratio or less) from the average voltage for at least a certain period of time after one hour of supplying the constant current, the scanning 1.8 A/cm$^2$ scheme may be applied.

The apparatus for providing operation logic of a fuel cell system may perform constant current operation on the fuel cell for a building. The experimental result exhibited that, according to the apparatus for providing operation logic of a fuel cell system, the performance of the fuel cell in the scanning 1.8 A/cm$^2$ scheme was improved by 12 mV when compared to the existing reference on the basis of an end point of constant current operation (50 hours), and although a voltage reduction rate of the existing reference was 225 μV/hr for 50 hours compared to 10 hours, the voltage reduction rate in the scanning 1.8 A/cm$^2$ scheme was 14 μV/hr for 50 hours compared to 10 hours, which is about 94% lower than the existing reference, indicating the voltage reduction rate was improved.

In addition, it was confirmed that the apparatus for providing operation logic of a fuel cell system had the same behavior for the first five hours as a way of operation to which the scanning 1.8 A/cm$^2$ scheme was applied through the reference, confirming that there was no effect on degradation of the fuel cell.

The apparatus for providing operation logic of a fuel cell system may lower the cell voltage to a voltage of 0.5 V or less to remove the oxide film on the surface of the platinum catalyst using a way of recovery operation of the scanning 1.8 A/cm$^2$ scheme and simultaneously, hydrate the inside of the fuel cell to a temporary high output state, thereby improving the performance of the fuel cell and reducing the voltage reduction rate. In addition, the apparatus for providing operation logic of a fuel cell system may change a scanning range to a current density capable of reducing the scanning range to a voltage of 0.5 V or less according to fuel cell performance.

FIG. 4 is a flowchart illustrating a scanning 0.4 V scheme of the method of providing operation logic of a fuel cell system according to an embodiment.

Referring to FIG. 4, the operation logic to which the scanning 1.8 A/cm$^2$ scheme is applied can be seen.

In operation 402, the apparatus for providing operation logic of a fuel cell system first performs fuel cell start-up and may inject the maximum flow rate under conditions in which a cell temperature is 65° C., relative humidity is 100%, and a stoichiometric ratio (SR) is An(H$_2$):Ca(Air)=1.5:2.0.

In operation 404, the apparatus for providing operation logic of a fuel cell system may scan an open circuit voltage (OCV)↔0.4 V by 0.1V in a constant voltage (CV) mode as an initial activation operation and maintain the voltage at 0.4 V for four minutes.

In operation 406, when a current density value at the voltage of 0.4 V is less than or equal to a preset value/threshold value such as 1.6 A/cm$^2$, the apparatus for providing operation logic of a fuel cell system may further perform the activation.

In operation 408, when the current density value of the activation/saturation is greater than or equal to 1.6 A/cm$^2$ (preset value/threshold value), the apparatus for providing operation logic of a fuel cell system may proceed/perform the constant current operation. In this case, since the cell temperature is 65° C., the RH is 100%, and the SR is An(H$_2$):Ca(Air)=1.33:2.0, the apparatus for providing operation logic of a fuel cell system may measure a voltage by switching to a constant current (CC) mode and applying a current density of 564 mA/cm$^2$.

In operation 410, the apparatus for providing operation logic of a fuel cell system may determine whether the constant current operation is completed.

In operation 412, when it is determined that the constant current operation is not completed, the apparatus for providing operation logic of a fuel cell system may calculate an average voltage over ten minutes (at least a predetermined time) after one hour of constant current evaluation and then may determine whether a present voltage is decreased by 1% or more from the average voltage.

In operation 414, when the present voltage is decreased by 1% or more from the average voltage, the apparatus for providing operation logic of a fuel cell system may apply a scanning 0.4 V scheme. The apparatus for providing operation logic of a fuel cell system may switch the CC mode to the CV mode in the scanning 0.4 V scheme and then maintain a voltage at 0.4 V for one minute while scanning 0.7 V↔0.4 V by 0.1 V.

In operation 416, the apparatus for providing operation logic of a fuel cell system may stop the operation of the fuel cell when it is determined that the constant current operation is completed.

The apparatus for providing operation logic of a fuel cell system may provide a protocol to which the scanning 0.4 V scheme is applied, and when a voltage is decreased by 1% or less (a preset ratio or less) from the average voltage for at least a certain period of time after one hour of supplying the constant current, the scanning 0.4 V scheme may be applied.

The apparatus for providing operation logic of a fuel cell system may perform constant current operation on the fuel cell for a building. The experimental result exhibited that, according to the apparatus for providing operation logic of a fuel cell system, the performance of the fuel cell in the scanning 0.4 V scheme was improved by 12 mV when compared to the existing reference on the basis of an end point of constant current operation (50 hours), and although a voltage reduction rate of the existing reference was 275 $\mu$V/hr for 50 hours compared to 10 hours, the voltage reduction rate in the scanning 0.4 V scheme was 11 $\mu$V/hr for 50 hours compared to 10 hours, which is about 96% lower than the existing reference, indicating that the voltage reduction rate was improved.

In addition, it was confirmed that the apparatus for providing operation logic of a fuel cell system had the same behavior for the first five hours as a way of operation to which the scanning 0.4 V scheme was applied through the reference, confirming that there was no effect on degradation of the fuel cell.

The apparatus for providing operation logic of a fuel cell system may lower the cell voltage to a voltage of 0.5 V or less to remove the oxide film on the surface of the platinum catalyst using a way of recovery operation of the scanning 0.4 V scheme and simultaneously, hydrate the inside of the fuel cell to a temporary high output state, thereby improving the performance of the fuel cell and reducing the voltage reduction rate.

FIG. 5 is a flowchart illustrating a soaking scheme of the method of providing operation logic of a fuel cell system according to an embodiment.

Referring to FIG. 5, the operation logic to which a soaking scheme is applied can be seen.

In operation 502, the apparatus for providing operation logic of a fuel cell system first performs fuel cell start-up and may inject the maximum flow rate under conditions in which a cell temperature is 65° C., relative humidity is 100%, and a stoichiometric ratio (SR) is An(H$_2$):Ca(Air)=1.5:2.0.

In operation 504, the apparatus for providing operation logic of a fuel cell system may scan an open circuit voltage (OCV)↔0.4 V by 0.1V in a constant voltage (CV) mode as an initial activation operation and maintain the voltage at 0.4 V for four minutes.

In operation 506, when a current density value at the voltage of 0.4 V is less than or equal to a preset value/threshold value such as 1.6 A/cm$^2$, the apparatus for providing operation logic of a fuel cell system may further perform the activation.

In operation 508, when the current density value of the activation/saturation is greater than or equal to 1.6 A/cm$^2$ (preset value/threshold value), the apparatus for providing operation logic of a fuel cell system may proceed/perform the constant current operation. In this case, since the cell temperature is 65° C., the RH is 100%, and the SR is An(H$_2$):Ca(Air)=1.33:2.0, the apparatus for providing operation logic of a fuel cell system may measure a voltage by switching to a constant current (CC) mode and applying a current density of 564 mA/cm$^2$.

In operation 510, the apparatus for providing operation logic of a fuel cell system may determine whether the constant current operation is completed.

In operation 512, when it is determined that the constant current operation is not completed, the apparatus for providing operation logic of a fuel cell system may calculate an average voltage over ten minutes (at least a predetermined time) after one hour of constant current evaluation and then may determine whether a present voltage is decreased by 1% or more from the average voltage.

In operation 514, when the present voltage is decreased by 1% or more from the average voltage, the apparatus for providing operation logic of a fuel cell system may apply the soaking scheme. The apparatus for providing operation logic of a fuel cell system may provide a way of a concept in which cell temperature lowering and system OFF are combined in a soaking scheme. The apparatus for providing operation logic of a fuel cell system may switch the CC mode to the OCV mode, start to lower the cell temperature, maintain the RH at 100% when the cell temperature is lowered, and lower the cell temperature to room temperature. Thereafter, the apparatus for providing operation logic of a fuel cell system may turn the fuel cell system off and maintain the turned-off state for one hour.

In operation 516, the apparatus for providing operation logic of a fuel cell system may restart the fuel cell system after one hour. In this case, starting conditions may be the same as in operation 502 of the fuel cell start-up.

In operation 518, the apparatus for providing operation logic of a fuel cell system may proceed/perform a pre-conditioning process five times (a preset number of times). A way of this case may be the same as in operation 504 of the initial activation.

In operation 520, the apparatus for providing operation logic of a fuel cell system may stop the operation of the fuel cell when it is determined that the constant current operation is completed.

The apparatus for providing operation logic of a fuel cell system may provide a protocol to which the soaking scheme is applied, and when a voltage is decreased by 1% or less (a preset ratio or less) from the average voltage for at least a certain period of time after one hour of supplying the constant current, the soaking scheme may be applied.

The apparatus for providing operation logic of a fuel cell system may perform constant current operation on the fuel cell for a building. According to the apparatus for providing operation logic of a fuel cell system, the performance of the fuel cell after the soaking scheme was applied was improved by 11 mV when compared to the existing reference on the basis of the end point of constant current operation (50 hours) (initial 10-hour constant current operation after initial activation) and the performance of the fuel cell was improved after the soaking by 13 mV when compared to the existing reference.

Although a voltage reduction rate of the existing reference was 225 $\mu$V/hr for 50 hours compared to 10 hours, the experimental result exhibited that the voltage reduction rate during the soaking was 7 $\mu$V/hr for 50 hours compared to 10 hours, which is about 97% lower than the existing reference, indicating that the voltage reduction rate was improved.

In addition, it was confirmed that that the apparatus for providing operation logic of a fuel cell system had the same behavior for the first five hours as a way of operation to which the soaking scheme was applied through the reference, confirming that there was no effect on degradation of the fuel cell.

The apparatus for providing operation logic of a fuel cell system may supersaturate the fuel cell by lowering the cell temperature using an evaluation method of the soaking scheme to hydrate the inside of the fuel cell, lower the cell voltage to a voltage of 0.5 V or less, and remove the oxide film on the surface of the platinum catalyst, thereby improving the performance of the fuel cell and reducing the voltage reduction rate.

FIG. 6 is a flowchart illustrating a cell temperature lowering scheme of the method of providing operation logic of a fuel cell system according to an embodiment.

Referring to FIG. 6, the operation logic to which the cell temperature lowering scheme is applied can be seen.

In operation 602, the apparatus for providing operation logic of a fuel cell system first performs fuel cell start-up and may inject the maximum flow rate under conditions in which a cell temperature is 65° C., relative humidity is 100%, and a stoichiometric ratio (SR) is An(H$_2$):Ca(Air)=1.5:2.0.

In operation 604, the apparatus for providing operation logic of a fuel cell system may scan an open circuit voltage (OCV)↔0.4 V by 0.1V in a constant voltage (CV) mode as an initial activation operation and maintain the voltage at 0.4 V for four minutes.

In operation 606, when a current density value at the voltage of 0.4 V is less than or equal to a preset value/threshold value such as 1.6 A/cm$^2$, the apparatus for providing operation logic of a fuel cell system may further perform the activation.

In operation 608, when the current density value of the activation/saturation is greater than or equal to 1.6 A/cm$^2$ (preset value/threshold value), the apparatus for providing operation logic of a fuel cell system may proceed/perform the constant current operation. In this case, since the cell temperature is 65° C., the RH is 100%, and the SR is An(H$_2$):Ca(Air)=1.33:2.0, the apparatus for providing operation logic of a fuel cell system may measure a voltage by switching to a constant current (CC) mode and applying a current density of 564 mA/cm$^2$.

In operation 610, the apparatus for providing operation logic of a fuel cell system may determine whether the constant current operation is completed.

In operation 612, when it is determined that the constant current operation is not completed, the apparatus for providing operation logic of a fuel cell system may determine whether a continuous operation time is greater than or equal to a preset time (e.g., five hours).

In operation 614, when the continuous operation time is greater than or equal to the preset time (for example, when constant current evaluation is continuously performed for five hours), the apparatus for providing operation logic of a fuel cell system may lower the cell temperature of the fuel cell by using/performing the cell temperature lowering scheme. In this case, the lowering of the cell temperature may include lowering only the cell temperature to 30° C. for one hour while continuously maintaining the constant current.

In operation 616, the apparatus for providing operation logic of a fuel cell system may stop the operation of the fuel cell when it is determined that the constant current operation is completed.

The apparatus for providing operation logic of a fuel cell system may provide a protocol to which the cell temperature lowering scheme is applied and may apply the cell temperature lowering scheme every five hours of constant current operation.

The apparatus for providing operation logic of a fuel cell system may perform constant current operation on the fuel cell for a building. According to the apparatus for providing operation logic of a fuel cell system, the performance of the fuel cell to which the cell temperature lowering was applied was improved by 4 mV when compared to the existing reference on the basis of the end point of the constant current operation (40 hours).

Although a voltage reduction rate of the existing reference was 267 µV/hr for 40 hours compared to 10 hours, the experimental result exhibited that the voltage reduction rate of the way of operating to which the cell temperature lowering scheme was applied was 141 µV/hr for 40 hours compared to 10 hours, which is about 47% lower than the existing reference, indicating that the voltage reduction rate was improved.

In addition, it was confirmed that the apparatus for providing operation logic of a fuel cell system had the same behavior for the first five hours as the protocol to which the cell temperature lowering scheme was applied through the reference, confirming there was no effect on degradation of the fuel cell.

The apparatus for providing operation logic of a fuel cell system may improve the performance of the fuel cell and reduce the voltage reduction rate by temporarily generating a supersaturated state and hydrating the inside of the cell using the cell temperature lowering scheme and may confirm the degree of improvement in the performance of the fuel cell only with hydration and the degree of reduction in the voltage reduction rate.

FIG. 7 is a block diagram illustrating a fuel cell system according to an embodiment.

According to an embodiment, a fuel cell system 700 may include a stack module 701, perform activation on a fuel cell, and perform constant current operation according to the activation.

According to an embodiment, the activation on the fuel cell may be performed again on the basis of an activation current.

According to an embodiment, at least a part of the stack module 701 may be managed on the basis of a variation in voltage while the constant current operation is performed.

At least a part of the fuel cell system 700 may be managed by at least a part of the above-described apparatus or method.

FIG. 8 is a block diagram illustrating a fuel cell system according to an embodiment.

Referring to FIG. 8 illustrating a block diagram of polymer electrolyte membrane fuel cell (PEMFC) system, a stack module 801 of the PEMFC system is illustrated which may receive fuel and generate power. The stack module 801 may be formed of a single stack by stacking multiple sheets of a membrane electrode assembly (MEA).

Each component of the fuel cell system may be connected to at least some of the other components. The fuel cell system may include at least some of the parts shown in FIG. 8 as components.

FIG. 9 is a block diagram illustrating a stack module of the fuel cell system according to an embodiment.

Referring to FIG. 9 illustrating a schematic diagram of a unit cell of the PEMFC, it can be seen that the unit cell is formed of a single MEA. In this case, Pt/C electrodes are present at an anode and a cathode, respectively, and an oxide may be generated on a surface of a Pt catalyst according to a fuel cell reaction.

At least some components of the fuel cell system may use the following chemical reaction scheme.

$$Pt + H_2O \leftrightarrow PtO + 2H_+ + 2e_-$$

$$PtO + H_2O \leftrightarrow PtO_2 + 2H_+ + 2e_-$$

FIG. 10 is an enlarged view illustrating a surface of a platinum catalyst according to an embodiment.

FIG. 10 is an enlarged schematic diagram illustrating a surface of a Pt catalyst 901 (see FIG. 9), and it can be seen that a platinum oxide film 1001 is removed after applying the above-described recovery mode.

The term "~part" used in the embodiments refers to software or hardware components such as a field programmable gate array (FPGA) or an application specific integrated circuit (ASIC) and performs predetermined roles. However, the term "~part" is not limited to software or hardware. The "~part" may be formed to be stored in an addressable storage medium or to reproduce one or more processors. Thus, as an example, the "~part" includes components such as software components, object-oriented software components, class components, and task components, and processes, functions, attributes, procedures, sub-routines, segments of program code, drivers, firmware, microcode, circuits, data, databases, data structures, tables, arrays, and variables. The functions provided in the components and the "~part" may be combined into a smaller number of components and "~parts" or may be further divided into additional components and "~parts." In addition, the components and the "~parts" may be implemented to reproduce one or more central processing units (CPUs) in a device or a secure multimedia card.

Although the description has been made with reference to the exemplary embodiments of the disclosure, it should be understood that various alterations and modifications of the disclosure can be devised by those skilled in the art to which the disclosure pertains without departing from the spirit and scope of the disclosure, which are defined by the appended claims.

What is claimed is:

1. An apparatus for providing operation logic of a fuel cell system, the apparatus comprising:
 an activation part configured to perform initial activation on a fuel cell; and
 an operating performance part configured to perform a constant current operation in response to the initial activation,
 wherein the apparatus performs activation again, based on a current density value at constant voltage maintained in the initial activation being less than or equal to a preset value.

2. The apparatus of claim 1, wherein the activation part performs the activation again on a basis of an activation current.

3. The apparatus of claim 2, wherein the activation part compares a value of the activation current with a preset threshold value.

4. The apparatus of claim 2, wherein the operating performance part performs the constant current operation on the basis of the activation current.

5. The apparatus of claim 1, wherein the operating performance part includes a fuel cell management part configured to manage the fuel cell on a basis of a variation in voltage while the constant current operation is performed.

6. The apparatus of claim 5, wherein the fuel cell management part manages at least a part of a stack module of the fuel cell.

7. A method of providing operation logic of a fuel cell system, the method comprising:
 performing, by an activation part, initial activation on a fuel cell; and
 performing, by an operating performance part, a constant current operation in response to the initial activation,
 performing, by the activation part, activation again, based on a current density value at constant voltage maintained in the initial activation being less than or equal to a preset value.

8. The method of claim 7, wherein the performing of the activation includes performing the activation again on a basis of an activation current.

9. The method of claim 8, wherein the performing of the activation includes comparing, by the activation part, a value of the activation current with a preset threshold value.

10. The method of claim 8, wherein the performing of the constant current operation includes performing, by the operating performance part, the constant current operation on the basis of the activation current.

11. The method of claim 7, wherein the performing of the constant current operation includes managing, by a fuel cell management part, the fuel cell on a basis of a variation in voltage while the constant current operation is performed.

12. The method of claim 11, wherein the managing of the fuel cell includes managing, by the fuel cell management part, at least a part of a stack module of the fuel cell.

13. A fuel cell system comprising:
 a stack module of a fuel cell,
 wherein the fuel cell is configured to be initial activated and subjected to a constant current operation in response to the initial activation,
 wherein the system performs activation again, based on a current density value at constant voltage maintained in the initial activation being less than or equal to a preset value.

14. The fuel cell system of claim 13, wherein the activation of the fuel cell is performed again on a basis of an activation current.

15. The fuel cell system of claim 13, wherein at least a part of the stack module is configured to be managed on a basis of a variation in voltage while the constant current operation is performed.

* * * * *